United States Patent
Yamazaki et al.

(10) Patent No.: US 8,824,930 B2
(45) Date of Patent: Sep. 2, 2014

(54) SYNCHRONIZED DRIVE UNIT AND IMAGE FORMING APPARATUS HAVING THE SYNCHRONIZED DRIVE UNIT

(75) Inventors: Kimiharu Yamazaki, Kanagawa (JP); Masahiro Ishida, Kanagawa (JP); Yohei Miura, Tokyo (JP); Noriaki Funamoto, Tokyo (JP); Shinya Shimizu, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 104 days.

(21) Appl. No.: 13/348,271

(22) Filed: Jan. 11, 2012

(65) Prior Publication Data

US 2012/0201571 A1    Aug. 9, 2012

(30) Foreign Application Priority Data

Feb. 8, 2011  (JP) .................. 2011-024841
Nov. 24, 2011  (JP) .................. 2011-255844

(51) Int. Cl.
  *G03G 15/00*  (2006.01)
  *G03G 15/01*  (2006.01)
  *F16H 7/00*  (2006.01)

(52) U.S. Cl.
  CPC .......... *G03G 15/757* (2013.01); *G03G 15/5008* (2013.01); *G03G 15/0178* (2013.01); *G03G 2215/0119* (2013.01); *G03G 2221/1657* (2013.01); *F16H 7/00* (2013.01)
  USPC ......................................... 399/167; 474/148

(58) Field of Classification Search
  CPC ...... G03G 15/00; G03G 15/01; G03G 15/757
  USPC ................................. 399/165, 167
  See application file for complete search history.

(56) References Cited

U.S. PATENT DOCUMENTS

| 6,125,253 | A  | * | 9/2000 | Tashima et al. | 399/167 |
| 6,382,094 | B1 | * | 5/2002 | Chiba et al. | 101/116 |
| 6,592,481 | B2 | * | 7/2003 | Sato et al. | 474/134 |
| 6,925,279 | B2 | * | 8/2005 | Kamoshita et al. | 399/303 |
| 6,941,096 | B2 | * | 9/2005 | Matsuda et al. | 399/167 |
| 6,996,357 | B2 | * | 2/2006 | Matsuda et al. | 399/167 |
| 7,110,700 | B2 | * | 9/2006 | Andoh et al. | 399/167 |

(Continued)

FOREIGN PATENT DOCUMENTS

CN  101556446 A  10/2009
JP  07-140732 A  6/1995

(Continued)

OTHER PUBLICATIONS

Chinese Office Action dated Feb. 28, 2014 for corresponding Chinese Application No. 201210023966.8.

*Primary Examiner* — Clayton E Laballe
*Assistant Examiner* — Kevin Butler
(74) *Attorney, Agent, or Firm* — Harness, Dickey & Pierce, P.L.C.

(57) ABSTRACT

A synchronized drive unit, including a drive member including a pulley; a driven member including a pulley; a relay member including to transmit a power; and timing belts hung around the drive and driven members through the relay member with tension and rotates the drive and driven members in synchronization, wherein each of the timing belts is formed of plural narrow timing belts parallely placed in a rotational axis direction of the pulley and the narrow timing belts are located on the driven member so as to counteract their eccentric components each other.

17 Claims, 6 Drawing Sheets

(56) References Cited

U.S. PATENT DOCUMENTS

| | | | |
|---|---|---|---|
| 7,251,444 B2* | 7/2007 | Matsuda et al. | 399/301 |
| 7,460,820 B2* | 12/2008 | Okabe | 399/301 |
| 8,059,991 B2* | 11/2011 | Andoh et al. | 399/167 |
| 8,588,651 B2* | 11/2013 | Matsuda et al. | 399/167 |
| 2001/0024986 A1* | 9/2001 | Sato et al. | 474/148 |
| 2003/0210932 A1* | 11/2003 | Koide et al. | 399/302 |
| 2003/0223786 A1* | 12/2003 | Kamoshita et al. | 399/302 |
| 2004/0086299 A1* | 5/2004 | Matsuda et al. | 399/167 |
| 2004/0131386 A1* | 7/2004 | Koide | 399/167 |
| 2005/0249524 A1* | 11/2005 | Matsuda et al. | 399/167 |
| 2006/0088338 A1* | 4/2006 | Matsuda et al. | 399/167 |
| 2006/0110189 A1* | 5/2006 | Matsuda et al. | 399/301 |
| 2007/0172257 A1* | 7/2007 | Matsuda et al. | 399/167 |
| 2007/0258729 A1 | 11/2007 | Ehara et al. | |
| 2008/0226344 A1* | 9/2008 | Cha | 399/167 |
| 2009/0255359 A1 | 10/2009 | Ito et al. | |
| 2010/0017019 A1* | 1/2010 | Andoh et al. | 700/229 |
| 2011/0110688 A1* | 5/2011 | Takigawa | 399/167 |
| 2011/0182602 A1* | 7/2011 | Suzuki | 399/49 |
| 2012/0201571 A1* | 8/2012 | Yamazaki et al. | 399/167 |

FOREIGN PATENT DOCUMENTS

| | | | |
|---|---|---|---|
| JP | 2000-310897 | * | 7/2000 |
| JP | 2001071613 A | | 3/2001 |
| JP | 2001254790 A | | 9/2001 |
| JP | 2003029483 A | | 1/2003 |
| JP | 2004-100863 | * | 2/2004 |
| JP | 2004-100863 | * | 4/2004 |
| JP | 2004100863 A | | 4/2004 |

\* cited by examiner

SYNCHRONIZED DRIVE UNIT AND IMAGE FORMING APPARATUS HAVING THE SYNCHRONIZED DRIVE UNIT

CROSS-REFERENCE TO RELATED APPLICATIONS

This patent application is based on and claims priority pursuant to 35 U.S.C. §119 to Japanese Patent Applications Nos. 2011-024841 and 2011-255844, filed on Feb. 8, 2011 and Nov. 24, 2011, respectively in the Japanese Patent Office, the entire disclosure of which is hereby incorporated herein by reference.

FIELD OF THE INVENTION

This invention relates to a synchronized drive unit suitable for being used in image forming apparatuses such as copiers, printers and facsimiles, and to an image forming apparatus having the synchronized drive unit.

BACKGROUND OF THE INVENTION

Conventionally, it is known that a drive transmission mechanism using a timing belt used in an electrophotographic image forming apparatus is mostly used in a part which does not comparatively influence upon images such as discharged paper feeders because a speed noticeably varies in one cyclic frequency of the belt. Therefore, it is known that a transmission mechanism in which gears are arrayed is used for an image forming drive transmission mechanism particularly likely to influence upon images among drive mechanisms.

Japanese published unexamined application No. 2004-100863 discloses an image forming apparatus using a timing belt and preventing a rotational shift variation thereof.

Japanese published unexamined application No. 2001-254790 discloses a configuration of dividing a timing belt into two and shifting the two belts at n/2 teeth when assembled to counteract eccentric components thereof each other for the purpose of preventing synchronized rotational shifts due to the eccentric components.

However, a conventional drive transmission mechanism using only a gear needs to use many gears when there is a distance between a drive member and a driven member and possibly deteriorates in banding due to overlapping of speed variation in engaging frequency or shock jitter due to the many gears therebetween. In order to solve this problem, precision gears have to inevitably be used and members holding the gears need to precisely be processed, resulting in higher cost of the drive mechanism. Therefore, precise drive using a timing belt has been studied, but a displacement of one cyclic component of the belt noticeably influences upon images. Further, when the belt has a maximum or a minimum length, speed variation noticeably deteriorates.

In Japanese published unexamined application No. 2004-100863, a pair of timing belts are hung around a drive pulley and a driven pulley with tension, and which cannot be used in the present invention having a relay member.

In Japanese published unexamined application No. 2001-254790, the two belts counteract the eccentric components thereof each other. However, variation components deteriorate according to the maximum or the minimum quality, and forming the two belts at the same position costs, which leaves room for improvement.

Because of these reasons, a need exists for a low-cost synchronized drive unit preventing speed and positional variation of one cyclic component of a timing belt in an image forming apparatus using the belt as a drive transmission mechanism.

SUMMARY OF THE INVENTION

Accordingly, an object of the present invention is to provide a low-cost synchronized drive unit preventing speed and positional variation of one cyclic component of a timing belt in an image forming apparatus using the belt as a drive transmission mechanism.

Another object of the present invention is to provide an image forming apparatus using the synchronized drive unit.

These objects and other objects of the present invention, either individually or collectively, have been satisfied by the discovery of a synchronized drive unit, comprising:

a drive member comprising a pulley;

a driven member comprising a pulley;

a relay member comprising a pulley, configured to transmit a power; and timing belts hung around the drive and driven members through the relay member with tension and configured to rotate the drive and driven members in synchronization, wherein each of the timing belts is formed of plural narrow timing belts parallely placed in a rotational axis direction of the pulley and the narrow timing belts are located on the driven member so as to counteract their eccentric components each other.

These and other objects, features and advantages of the present invention will become apparent upon consideration of the following description of the preferred embodiments of the present invention taken in conjunction with the accompanying drawings.

DETAILED DESCRIPTION OF THE INVENTION

Figure 1:
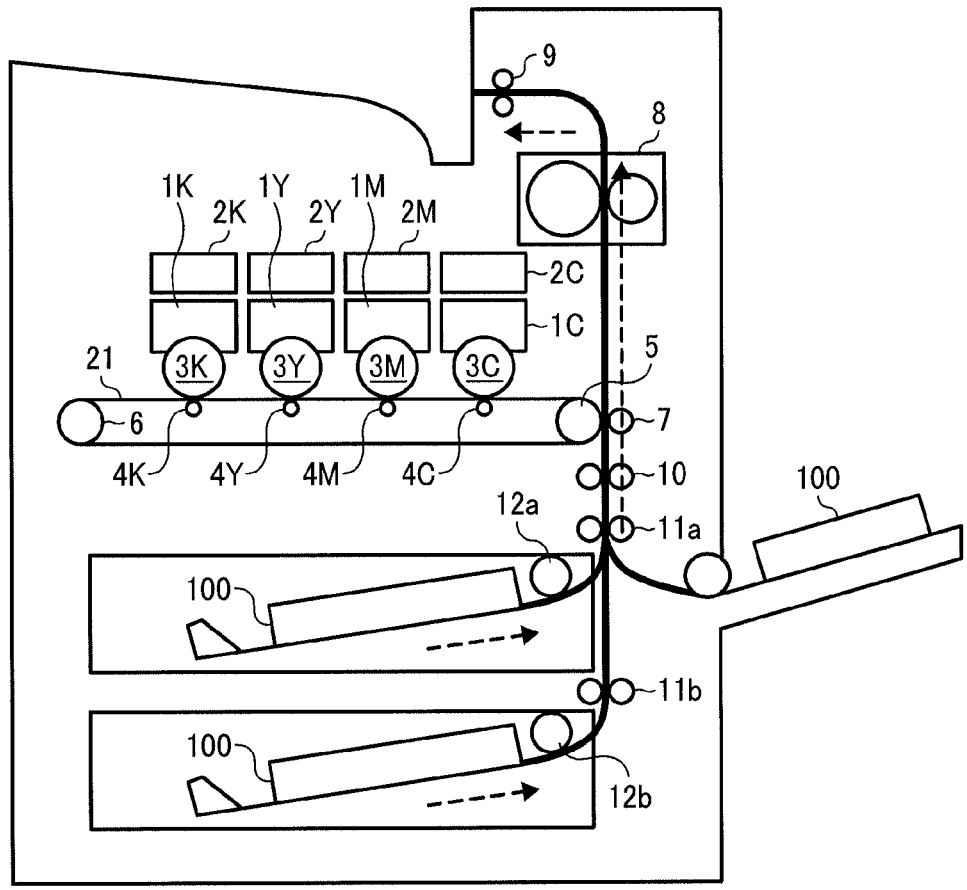
FIG. 1 is a schematic view illustrating an embodiment of the image forming apparatus of the present invention.

The present invention provides a low-cost synchronized drive unit preventing speed and positional variation of one cyclic component of a timing belt in an image forming apparatus using the belt as a drive transmission mechanism.

More particularly, the present invention relates to a synchronized drive unit, comprising:

a drive member comprising a pulley;

a driven member comprising a pulley;

a relay member comprising a pulley, configured to transmit a power; and timing belts hung around the drive and driven members through the relay member with tension and configured to rotate the drive and driven members in synchronization, wherein each of the timing belts is formed of plural narrow timing belts parallely placed in a rotational axis direction of the pulley and the narrow timing belts are located on the driven member so as to counteract their eccentric components each other.

The embodiments of the present invention are explained, referring to the drawings.

Typically, belts having long circumferential length are mostly used for belt drive because a drive source is away from a driven object. However, the longer the circumferential length, the more the length varies, resulting in deterioration of speed variation components. Further, one belt always has one cyclic variation component and displacement has been worried. However, when two same belts are assembled to cancel eccentric components, the one cyclic variation component can be cancelled. In addition, belts having less variation of length can be used with a relay pulley. Further, a timing belt drive unit can be prepared at low cost because the same two belts save molding cost.

The present invention has the following feature in drive transmission using a timing belt. The same two belts have one rotational variation component at the same frequency. An eccentric component of the drive timing belt is transmitted to the driven timing belt through the relay pulley. When the belts are assembled such that waves of the eccentric components of the drive timing belt and those of the driven timing belt are counteracted each other, a synchronized drive unit which does not transmit one rotational variation component of the timing belt to the driven pulley can be prepared. In short, the present invention is characterized in the belts are assembled to cancel the one rotational variation component of the timing belt.

The feature of the present invention is explained, referring to the drawings.

FIG. 1 is a schematic view illustrating an embodiment of the image forming apparatus including the synchronized drive unit of the present invention. The image forming apparatus is a tandem image forming apparatus including plural image forming units forming plural color images such as black (K) images, yellow (Y) images, magenta (M) images and cyan (C) images. The plural image forming units are formed of toner image forming units 1K, 1Y, 1M and 1C; optical writing units 2K, 2Y, 2M and 2C; drum-shaped photoreceptors 3K, 3Y, 3M and 3C; and transfer rollers 4K, 4Y, 4M and 4C, respectively.

The photoreceptor drums 3K, 3Y, 3M and 3C are located facing an endless intermediate transfer belt 21, and are driven to rotate at the same peripheral speed as that of the intermediate transfer belt 21. Each of the optical writing units 2K, 2Y, 2M and 2C drives a semiconductor laser by an unillustrated semiconductor laser drive circuit, deflects and scans a laser beam which is an image signal of each color from a semiconductor laser, and image the laser beam on each of the photoreceptor drums 3K, 3Y, 3M and 3C with an unillustrated fθ lens. After each of the photoreceptor drums 3K, 3Y, 3M and 3C is uniformly charged at each of the toner image forming unit 1K, 1Y, 1M and 1C, it is irradiated by each of the optical writing units 2K, 2Y, 2M and 2C to form an electrostatic latent image thereon.

Each of the electrostatic latent image on each the photoreceptor drums 3K, 3Y, 3M and 3C is developed by each of the toner image forming units 1K, 1Y, 1M and 1C to form each K, M, Y and C color toner image. The intermediate transfer belt 21 is hung around an intermediate transfer drive roller 5 and an intermediate transfer tension roller 6 with tension, the intermediate transfer drive roller 5 is driven to rotate by a synchronized drive unit mentioned later, and the intermediate transfer belt 21 rotates at the same peripheral speed of each of the photoreceptor drums 3K, 3Y, 3M and 3C. Each of the color toner images K, M, Y and C on each of the photoreceptor drums 3K, 3Y, 3M and 3C are sequentially and overlappingly transferred onto the intermediate transfer belt 21, and a full-color toner image is formed thereon.

Meanwhile, a transfer paper 100 is fed from paper feed rollers 12a and 12b through transfer rollers 11a and 11b along a transfer paper transfer route to a pair of registration rollers 10. The pair of registration rollers 10 transfers the transfer paper in timing for the toner image on the intermediate transfer belt 21. The toner image on the intermediate transfer belt 21 is transferred onto the transfer paper at a second transfer roller 7 to form a full-color toner image thereon. The transfer paper the full-color toner image is formed on is transferred to a fixer 8, where the full-color image is fixed thereon and discharged by a paper discharge roller 9.

In such a color copier, rotation preciseness of the photoreceptor drums 3K, 3Y, 3M and 3C as image bearers and the intermediate transfer belt 21 largely influences upon final image quality, and more precise rotation drive is desired. In the present invention, the rotation drive of the photoreceptor drums 3K, 3Y, 3M and 3C as image bearers and the intermediate transfer belt 21 is performed by the following synchronized drive unit. In the present invention, drive preciseness of the plural photoreceptor drums 3K, 3Y, 3M and 3C as image bearers and the intermediate transfer belt 21 is improved, i.e., the image bearers can more precisely be driven to produce high-quality images in an image forming apparatus rotating them.

The image bearers may be transfer drums or direct transfer belts.

Figure 2:
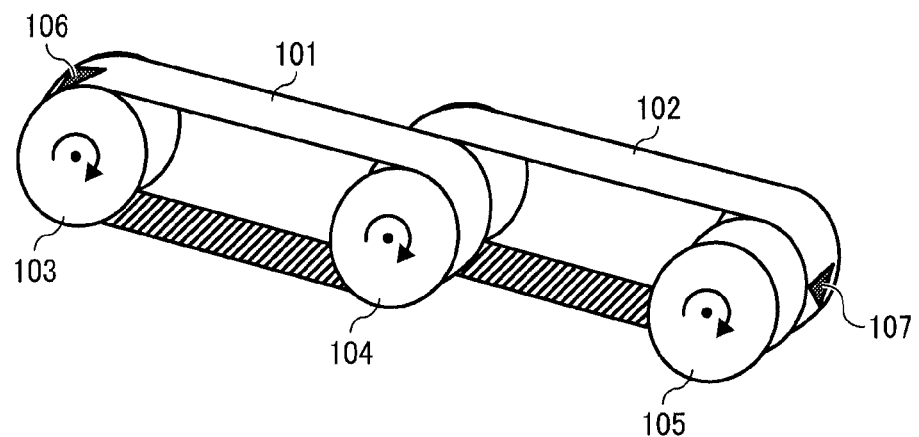
FIG. 2 is a schematic view illustrating a first embodiment of the synchronized drive unit using a relay pulley in the present invention.

FIG. 2 is a schematic view illustrating a first embodiment of the synchronized drive unit using a relay pulley in the present invention. Numeral 101 is a drive timing belt, 102 is a driven timing belt, 103 is a drive pulley, 104 is a relay pulley, 105 is a driven pully, 106 is a mark representing a direction and a position of the drive timing belt 101, and 107 is a mark representing a direction and a position of the driven timing belt 102. The drive timing belt 101 and the driven timing belt 102 are formed plural narrow timing belts arrayed in a rotational axial direction of the relay pulley 104. In addition, the drive timing belt 101 and the driven timing belt 102 are located so as to counteract their eccentric components each other on the driven pully 105.

When the drive pulley 103 rotates, a power is transmitted to the relay pulley 104 through the drive timing belt 101. When the relay pulley 104 rotates, the power is transmitted to the driven pully 105 through the driven timing belt 102. These elements of the synchronized drive unit are assembled at a predetermined distribution using the marks 106 and 107 as landmarks. The marks 106 and 107 can identify rotational directions of the timing belts 101 and 102, which rotate in the same direction. The timing belts 101 and 102 have plural marks 106 and 107, respectively.

Figure 3:
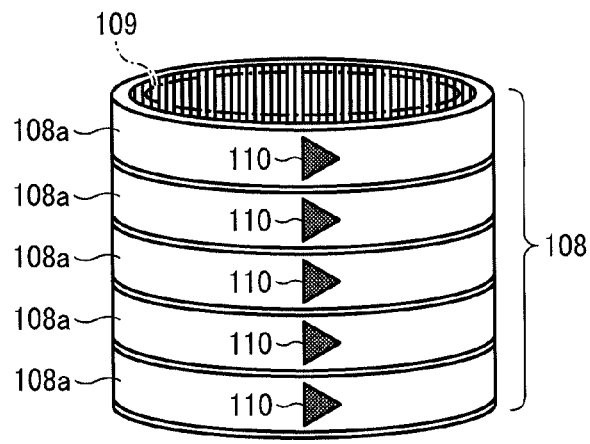
FIG. 3 is a schematic view illustrating mark positional relations of a timing belt of the first embodiment in the present invention.

FIG. 3 is a schematic view illustrating mark positional relations of a timing belt of the first embodiment in the present invention. A sleeve 108 includes plural timing belts 108a and is cut at a predetermined interval to prepare plural timing belts 108a. A mark 110 representing a direction and a position of the timing belt 108a has a positional relation with a specific gear of an inner metallic mold 109 for casting a gear of the sleeve 108. One cyclic speed variation of the timing belt 108a is largely caused by eccentricity or gear pitch error of the inner metallic mold 109, and the inner metallic mold 109 and the mark 110 having a positional relation can reliably cancel speed components. The marks 106 and 107 on the timing belt are on the same line as the mark 110 is thereon before divided, and point in the same direction as the mark 110 does.

Figure 4:
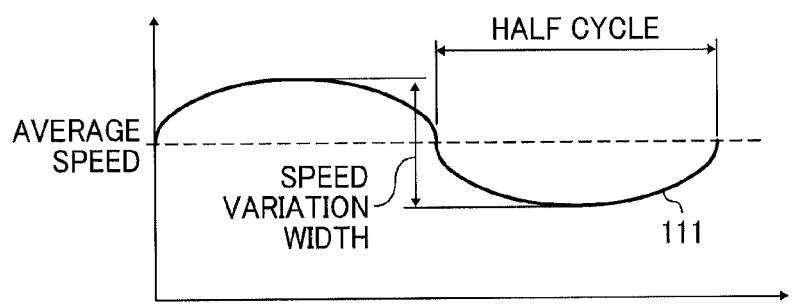
FIG. 4 is a diagram for explaining one cyclic speed variation of the timing belt in the present invention.
Figure 5:
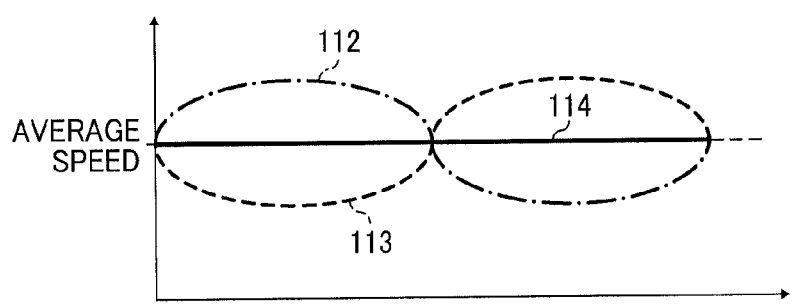
FIG. 5 is a diagram for explaining speed variation when the two timing belts are assembled in phase in the present invention.

FIG. 4 is a diagram for explaining one cyclic speed variation of one timing belt. As a speed variation 111, a timing belt always has a one cyclic speed variation due to influence of variations of its thickness and metallic mold, and its core. FIG. 5 is a diagram for explaining speed variation when the two timing belts are assembled in phase in the present invention. Numeral 112 is a speed variation of the drive timing belt 101 and 113 is a speed variation of the driven timing belt 102. Numeral 114 is a speed variation of the driven pulley when the drive timing belt 101 and the driven timing belt 102 are assembled in phase. Although the timing belt has a speed variation of one cyclic component, when the drive timing belt 101 and the driven timing belt 102 having the same length and amplitude are assembled so as to be shifted by 180°, the speed variation 114 which is a speed variation on the driven pulley per one cycle of the belt can be cancelled. This positional relation in which the drive timing belt 101 and the driven timing belt 102 are assembled so as to be shifted by 180° is a positional relation in which their eccentric components are counteracted each other on the driven member.

Table 1 shows a relation between (pitch) length and size tolerance of the timing belt.

TABLE 1

| Pitch length | Size tolerance |
| --- | --- |
| Not longer than 254 | ±0.40 |
| Longer than 254 and not longer than 381 | ±0.46 |
| Longer than 381 and not longer than 508 | ±0.50 |
| Longer than 508 and not longer than 762 | ±0.60 |
| Longer than 762 and not longer than 1016 | ±0.66 |
| Longer than 1016 and not longer than 1270 | ±0.76 |
| Longer than 1270 and not longer than 1524 | ±0.81 |
| Longer than 1524 and not longer than 1778 | ±0.86 |
| Longer than 1778 and not longer than 2032 | ±0.92 |

As Table 1 shows, the longer the timing belt, the larger the size tolerance. The longer a distance between a drive source and a driven object, the longer the belt, resulting in large difference between maximum quality and minimum quality. Consequently, transmission preciseness deteriorates. However, a relay pulley halves the length of the belt and prevents deterioration of the transmission preciseness.

Figure 6:
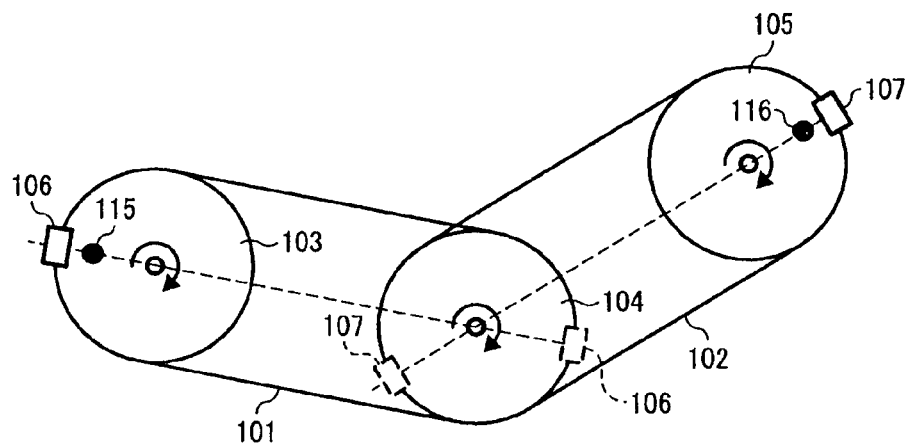
FIG. 6 is a schematic view illustrating mark positional relations of the two timing belts of the first embodiment in the present invention.

FIG. 6 is a schematic view illustrating mark positional relations of the two timing belts of the first embodiment in the present invention. A drive pulley 103 and a driven pulley 105 have a drive pulley mark 115 and a driven pulley mark 116 at positions oscillating most, respectively. The belt mark 106 and the drive pulley mark 115 are assembled at an antipodal position from the relay pulley 104 on an axial line connecting the relay pulley 104 and the drive pulley 103, and the belt mark 107 and the drive pulley mark 116 are assembled at an antipodal position from the relay pulley 104 on an axial line connecting the relay pulley 104 and the driven pulley 105. Assembled as in FIG. 6, the drive timing belt 101 and the driven timing belt 102 have a positional relation so as to be shifted by 180°. The positional relation is maintained even when the pulley rotates, and the marks 106 and 107 moves to, e.g., positions represented by a dashed line. In this example, the timing belt has a length twice as long as a peripheral length of the pulley.

Figure 7:
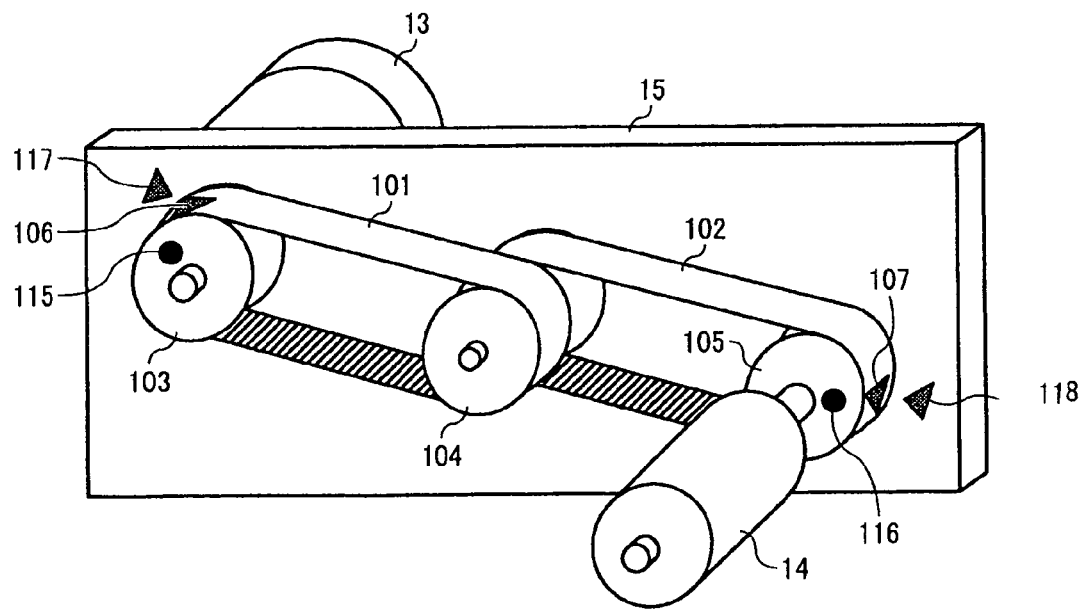
FIG. 7 is a schematic view illustrating a further example of the first embodiment of the synchronized drive in the present invention.

FIG. 7 is a schematic view illustrating a further example of the first embodiment of the synchronized drive. Numeral 13 is a motor, 14 is a driven object, and 15 is a fixed frame as a holding member holding a pulley. Marks 117 and 118 are marked on the fixed frame 15. The marks 117 and 118 meet marks 106 and 107 on the timing belts 101 and 102, respectively. The timing belts 101 and 102 are assembled, meeting the marks 106 and 107 with the marks 117 and 118 marked on the fixed frame 15. A driven pulley 103 is fitted on the motor 13 mounted on the fixed frame 15, and the motor 13 rotates a relay pulley 104 through the drive timing belts 101. In addition, the motor 13 rotates a driven pulley 105 through the driven timing belts 102. The cylindrical driven object 14 is mounted on the driven pulley 105, and consequently the motor 13 rotates the driven object 14.

Figure 8:
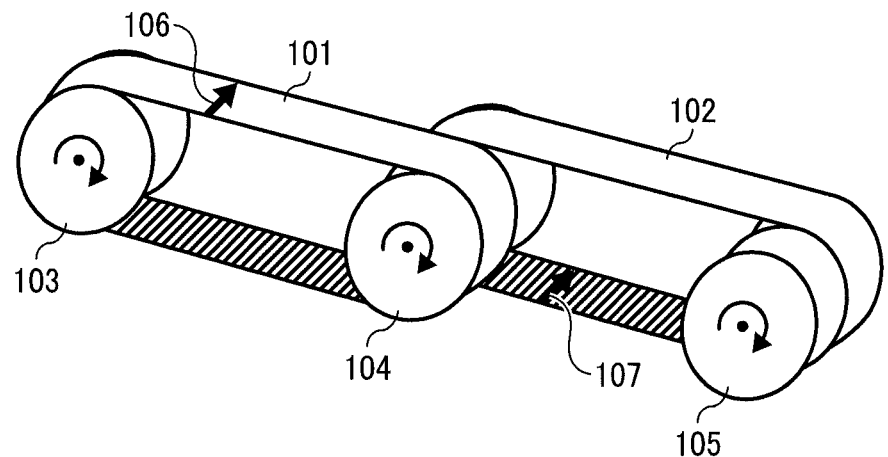
FIG. 8 is a schematic view illustrating a second embodiment of the synchronized drive unit using a relay pulley in the present invention.

FIG. 8 is a schematic view illustrating a second embodiment of the synchronized drive unit using a relay pulley in the present invention. The same numerals are used for the same elements as those in the first embodiment. Numeral 101 is a drive timing belt, 102 is a driven timing belt, 103 is a drive pulley, 104 is a relay pulley, 105 is a driven pulley 105, 106 is a mark representing a direction and a position of the drive timing belt 101, and 107 is a mark representing a direction and a position of the driven timing belt 102. The drive timing belt 101 and the driven timing belt 102 are formed plural narrow timing belts arrayed in a rotational axial direction of the relay pulley 104. In addition, the drive timing belt 101 and the driven timing belt 102 are located so as to counteract their eccentric components each other on the driven pully 105.

When the drive pulley 103 rotates, a power is transmitted to the relay pulley 104 through the drive timing belt 101. When the relay pulley 104 rotates, the power is transmitted to the driven pully 105 through the driven timing belt 102. These elements of the synchronized drive unit are assembled at a predetermined distribution using the marks 106 and 107 as landmarks.

Figure 9:
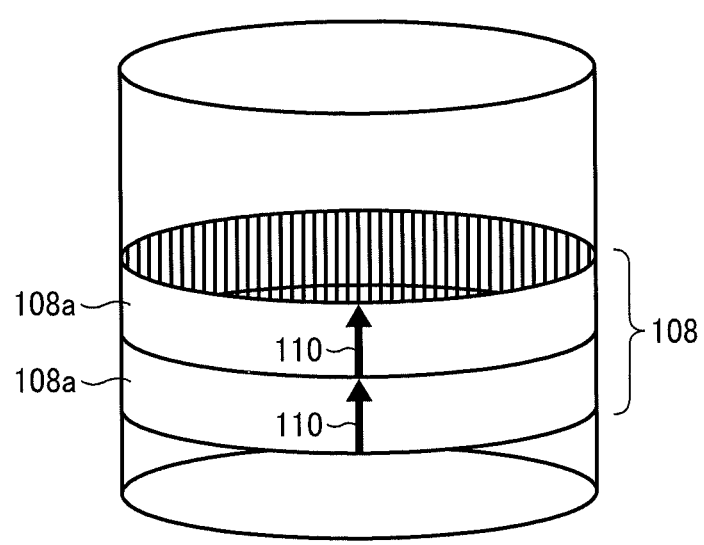
FIG. 9 is a schematic view illustrating mark positional relations of a timing belt of the second embodiment in the present invention.

FIG. 9 is a schematic view illustrating mark positional relations of a timing belt of the second embodiment in the present invention. A sleeve 108 is wider than the drive timing belt 101 and the driven timing belt 102. A mark 110 is marked at a part on a circumference of the sleeve 108. The sleeve 108 is divided into two narrow timing belts 108a having the same width. The timing belts 108a are the drive timing belt 101 and the driven timing belt 102, respectively. The mark 110 representing a direction and a position is marked on each of the timing belts. The marks 106 and 107 on the timing belts are on a same straight line as marks 110 before divided, and point a same direction. The mark 110 has a shape different from that of the first embodiment.

Figure 10:
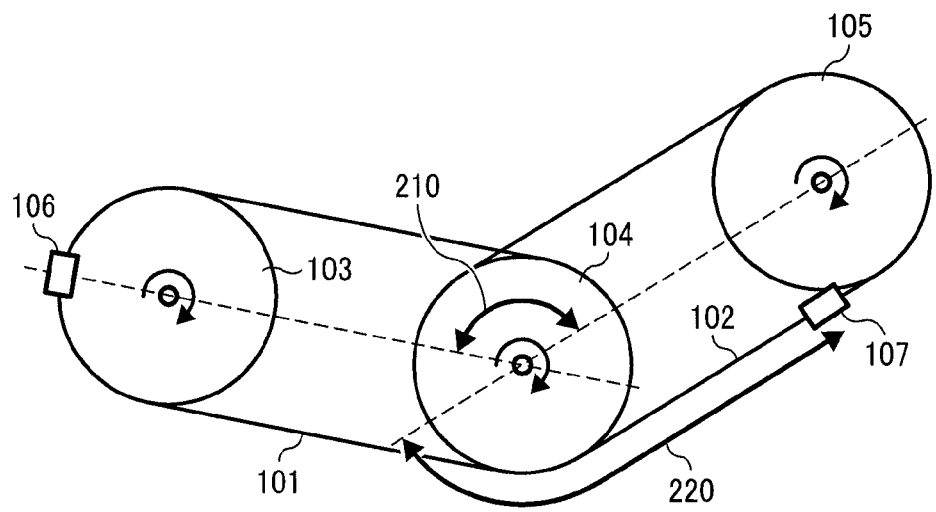
FIG. 10 is a schematic view illustrating mark positional relations of the two timing belts of the second embodiment.

FIG. 10 is a schematic view illustrating mark positional relations of the two timing belts of the second embodiment. An angle between a line connecting the drive pulley 103 with the relay pulley 104 and a line connecting the driven pulley 105 with the relay pulley 104 is θ (210), and a distance from a central position where the driven timing belt 102 contacts the relay pulley 104 to the mark 107 of the driven timing belt 102 is X (220). When the mark 106 of the drive timing belt 101 is at the center of a position contacting the drive pulley 103, it has a fixed positional relation (X=belt length×θ/360°) with the mark 107 of the driven timing belt 102. Namely, at the relay pulley 104, the drive timing belt 101 and the driven timing belt 102 are located so as to shift their teeth. When the drive timing belt 101 and the driven timing belt 102 are not on a straight line, they are assembled in phase to cancel speed variation per one cycle of the belt on the driven pulley.

Figure 11:
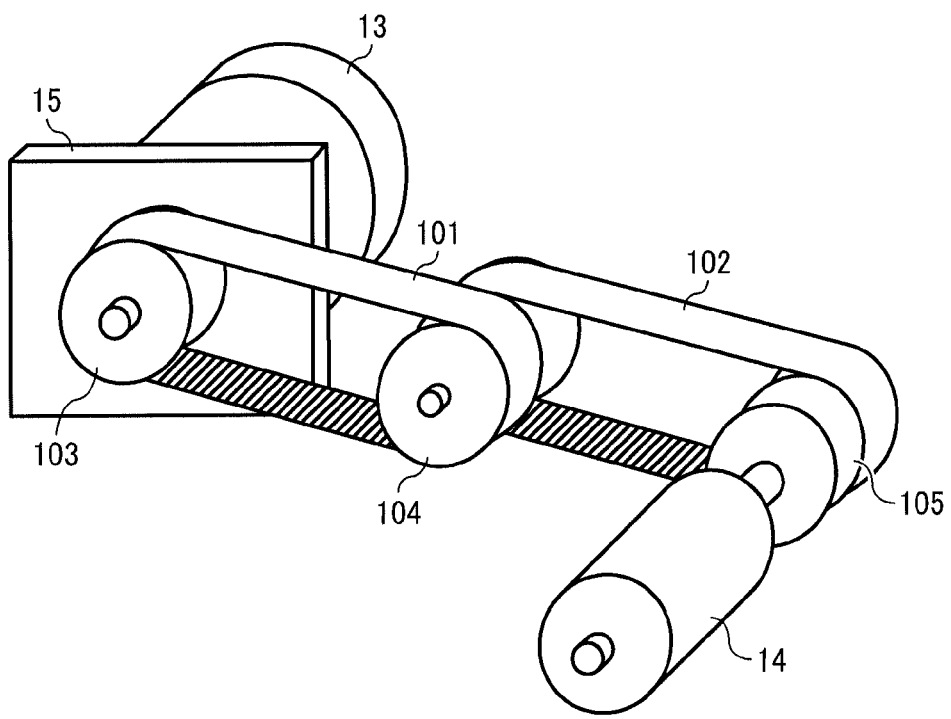
FIG. 11 is a schematic view illustrating a further example of the second embodiment of the synchronized drive in the present invention.

FIG. 11 is a schematic view illustrating a further example of the second embodiment of the synchronized drive. Numeral 13 is a motor, 14 is a driven object, and 15 is a fixed frame. A driven pulley 103 is fitted on the motor 13 mounted on the fixed frame 15, and the motor 13 rotates a relay pulley 104 through the drive timing belts 101. In addition, the motor 13 rotates a driven pulley 105 through the driven timing belts 102. The cylindrical driven object 14 is mounted on the driven pulley 105, and consequently the motor 13 rotates the driven object 14.

Figure 12:
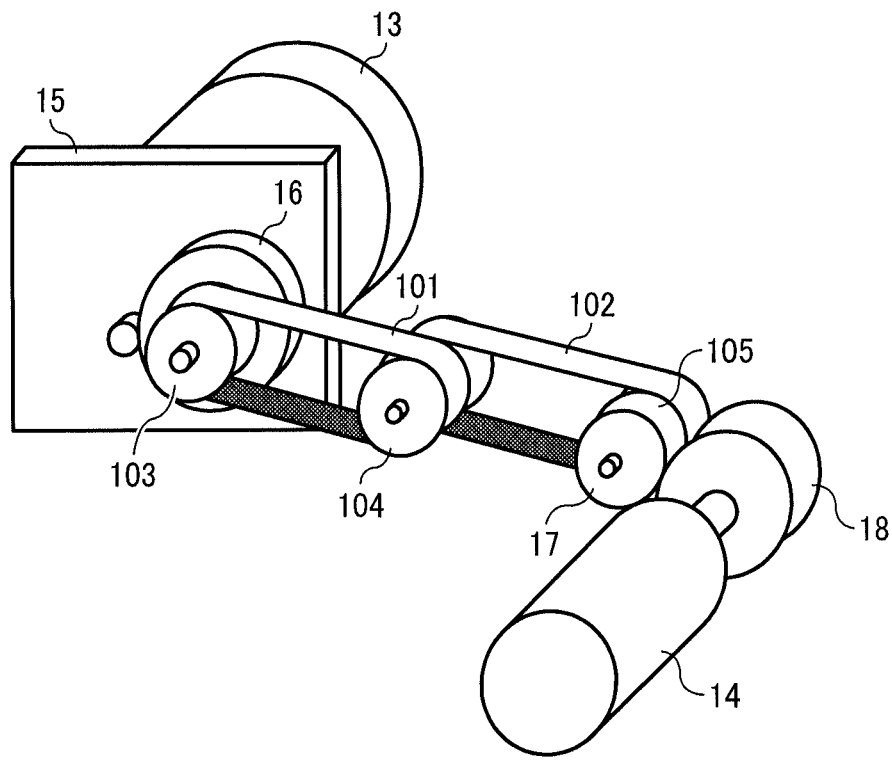
FIG. 12 is a schematic view illustrating a third embodiment of the synchronized drive unit in the present invention.
Figure 13:
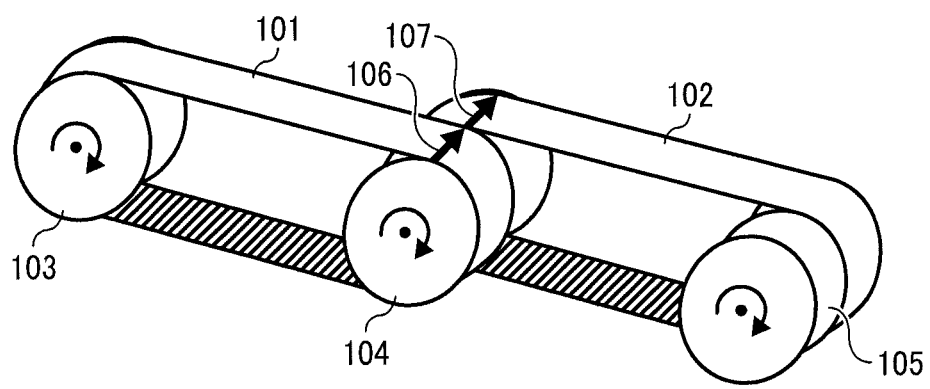
FIG. 13 is a schematic view illustrating mark positions when teeth of the two timing belts are not shifted.

FIG. 12 is a schematic view illustrating a third embodiment of the synchronized drive unit in the present invention. The same numerals are used for the same elements as those in the first and second embodiments. Numeral 16 is a drive pulley having a gear function, 17 is a driven pulley having a gear function, and 18 is a gear connected with a driven object. A motor 13 mounted on a fixed frame 15 has a shaft having teeth and rotates the drive pulley 16 to rotate a relay pulley 104 through the drive timing belts 101. In addition, the motor 13 rotates the driven pulley 17 having a gear function through the driven timing belts 102. The cylindrical gear 18 connected with the driven object is connected to teeth of the driven pulley having a gear function 17, and consequently the driven object rotates when the motor 13 rotates.

In these embodiments, the synchronized drive units rotates photoreceptor drums and intermediate transfer belts in image forming apparatuses, and the synchronized drive units of the present invention may rotate transfer drums as image bearers in image forming apparatuses using the transfer drums. For example, in a full-color image forming apparatus in which an electrostatic latent image is formed on a closed-loop photoreceptor belt, the electrostatic latent image is developed with a toner to form a full-color image, the full-color image is transferred onto a transfer drum, and the full-color image is transferred onto a transfer paper, the transfer drum may be rotated by the synchronized drive units of the present invention.

Further, in a full-color image forming apparatus in which a direct transfer belt as an image bearer is located facing photoreceptor drums as image bearers for each K, Y, M and C color, and each color toner image on the photoreceptor drums is directly transferred onto a transfer paper by the direct transfer belt while feeding the transfer paper to form a full-color image, the direct transfer belt and the photoreceptor drums may be rotated by the synchronized drive units of the present invention.

In the full-color image forming apparatus in FIG. 1, the transfer rollers 4K, 4Y, 4M and 4C are located at a fixed station pitch. One cycle of the timing is preferably 1/integer to prevent color shift even when the speed variation component cannot be cancelled due to assembly error.

The timing belt may have an allowable transmission torque not less than three times as large as a driven torque loaded on the driven pulley. This can prevent speed variation. In order that the timing belt has the allowable transmission torque not less than three times, the pulley diameter is enlarged to decrease a force on the timing belt, which reduces cost.

The timing belt is preferably formed of polyurethane. One cyclic component of the timing belt formed of polyurethane is stable and a speed variation component can reliably be cancelled.

The marks 106 and 107 are the mark 110 formed on the same position on the sleeve 108, and on the same position relative to teeth of the timing belt. Therefore, as seen from positions of the marks 106 and 107 in FIGS. 2, 6, 7, 8 and 10, the drive timing belt 101 and the driven timing belt 102 are located so as to shift teeth at the relay pulley 104. The marks 106 and 107 are on a same straight line as FIG. 14 shows should the teeth not be shifted.

Additional modifications and variations of the present invention are possible in light of the above teachings. It is therefore to be understood that within the scope of the appended claims the invention may be practiced other than as specifically described herein.

What is claimed is:

1. A synchronized drive unit, comprising:
    a drive member comprising a pulley;
    a driven member comprising a pulley;
    a relay member comprising a pulley, configured to transmit a power; and
    a timing belt hung around the drive and driven members through the relay member with tension and configured to rotate the drive and driven members in synchronization,
    wherein the timing belt is formed of plural narrow belts parallely placed in a rotational axis direction of the pulley, each of the plural narrow belts includes:
        a drive narrow belt hung around the drive member and the relay member with tension; and
        a driven narrow belt hung around the relay member and the driven member,
        wherein the plural narrow belts are located such that eccentric components of the drive narrow belts transmitted to the driven member through the relay member and those of the driven narrow belts transmitted thereto counteract each other on the driven member in a rotational direction,
    wherein each of the timing belts includes a plurality of the marks, and
    wherein one of the plurality of marks identifies rotational direction, and each of the plurality of marks is assembled in a same rotational direction.

2. The synchronized drive unit of claim 1, wherein the mark has a positional relation with an inner metallic mold for forming the timing belts.

3. The synchronized drive unit of claim 1, wherein each of the timing belts is formed of the two narrow timing belts, which are prepared by dividing one timing belt.

4. The synchronized drive unit of claim 3, wherein the two narrow timing belts are assembled in a same direction at the pulley of the relay member.

5. The synchronized drive unit of claim 1, wherein a land mark for the mark to meet with is located on a holding member holding the pulley.

6. The synchronized drive unit of claim 1, wherein oscillations of the pulleys of the drive member and the driven member are positioned to assemble the synchronized drive unit.

7. The synchronized drive unit of claim 1, wherein each of the timing belt has one cycle which is 1/integral multiple of each color station pitch in a full-color image forming apparatus.

8. The synchronized drive unit of claim 1, wherein each of the timing belt is located so as to shift teeth at the pulley of the relay member.

9. The synchronized drive unit of claim 1, wherein each of the timing belt has an allowable transmission torque not less than three times as large as that of a driven torque loaded on the pulley of the driven member.

10. The synchronized drive unit of claim 9, wherein the pulley of the driven member is enlarged such that each of the timing belt has an allowable transmission torque not less than three times as large as that the driven torque.

11. An image forming apparatus, comprising an image bearer rotated by the synchronized drive unit according to claim 1.

12. The image forming apparatus of claim 11, wherein the image bearer is a photoreceptor drum.

13. The image forming apparatus of claim 11, wherein the image bearer is an intermediate transfer belt.

14. A full-color image forming apparatus, comprising plural image bearers rotated by the synchronized drive unit according to claim 1.

15. A synchronized drive unit, comprising:
a drive member comprising a pulley;
a driven member comprising a pulley;
a relay member comprising a pulley, configured to transmit a power; and
a timing belt hung around the drive and driven members through the relay member with tension and configured to rotate the drive and driven members in synchronization,
wherein the timing belt is formed of plural narrow belts parallely placed in a rotational axis direction of the pulley, each of the plural narrow belts includes:
  a drive narrow belt hung around the drive member and the relay member with tension; and
  a driven narrow belt hung around the relay member and the driven member,
  wherein the plural narrow belts are located such that eccentric components of the drive narrow belts transmitted to the driven member through the relay member and those of the driven narrow belts transmitted thereto counteract each other on the driven member in a rotational direction, and
  wherein each of the pulleys of the drive member, the driven member and the relay member has the same diameter.

16. A synchronized drive unit, comprising:
a drive member comprising a pulley;
a driven member comprising a pulley;
a relay member comprising a pulley, configured to transmit a power; and
a timing belt hung around the drive and driven members through the relay member with tension and configured to rotate the drive and driven members in synchronization,
wherein the timing belt is formed of plural narrow belt parallely placed in a rotational axis direction of the pulley, each of the plural narrow belts includes:
  a drive narrow belt hung around the drive member and the relay member with tension; and
  a driven narrow belt hung around the relay member and the driven member,
  wherein the plural narrow belts are located such that eccentric components of the drive narrow belts transmitted to the driven member through the relay member and those of the driven narrow belts transmitted thereto counteract each other on the driven member in a rotational direction, and
  wherein each of the timing belt is formed of polyurethane.

17. A synchronized drive unit, comprising:
a drive member comprising a pulley;
a driven member comprising a pulley;
a relay member comprising a pulley, configured to transmit a power; and
a timing belt hung around the drive and driven members through the relay member with tension and configured to rotate the drive and driven members in synchronization,
wherein the timing belt is formed of plural narrow belts parallely placed in a rotational axis direction of the pulley, each of the plural narrow belts includes:
  a drive narrow belt hung around the drive member and the relay member with tension; and
  a driven narrow belt hung around the relay member and the driven member
  wherein the plural narrow belts are located such that eccentric components of the drive narrow belts transmitted to the driven member through the relay member and those of the driven narrow belts transmitted thereto counteract each other on the driven member in a rotational direction,
  wherein each of the timing belts includes a mark identifying its rotational direction, and each of the marks is assembled in a same rotational direction
  wherein each of the timing belt is located so as to shift teeth at the pulley of the relay member, and
  wherein an angle between a straight line connecting the drive member with the relay member and a straight line connecting the driven member with the relay member has a specific relation with a shifted amount of the teeth.

* * * * *